March 27, 1928.

E. A. CORBIN, JR 1,664,389

CUSHION WHEEL

Filed July 28, 1927

INVENTOR
Elbert A. Corbin, Jr
BY Herbert S. Fairbanks
ATTORNEY

March 27, 1928.

E. A. CORBIN, JR

CUSHION WHEEL

Filed July 28, 1927

INVENTOR

BY Elbert A. Corbin Jr
Herbert S. Fairbanks
ATTORNEY

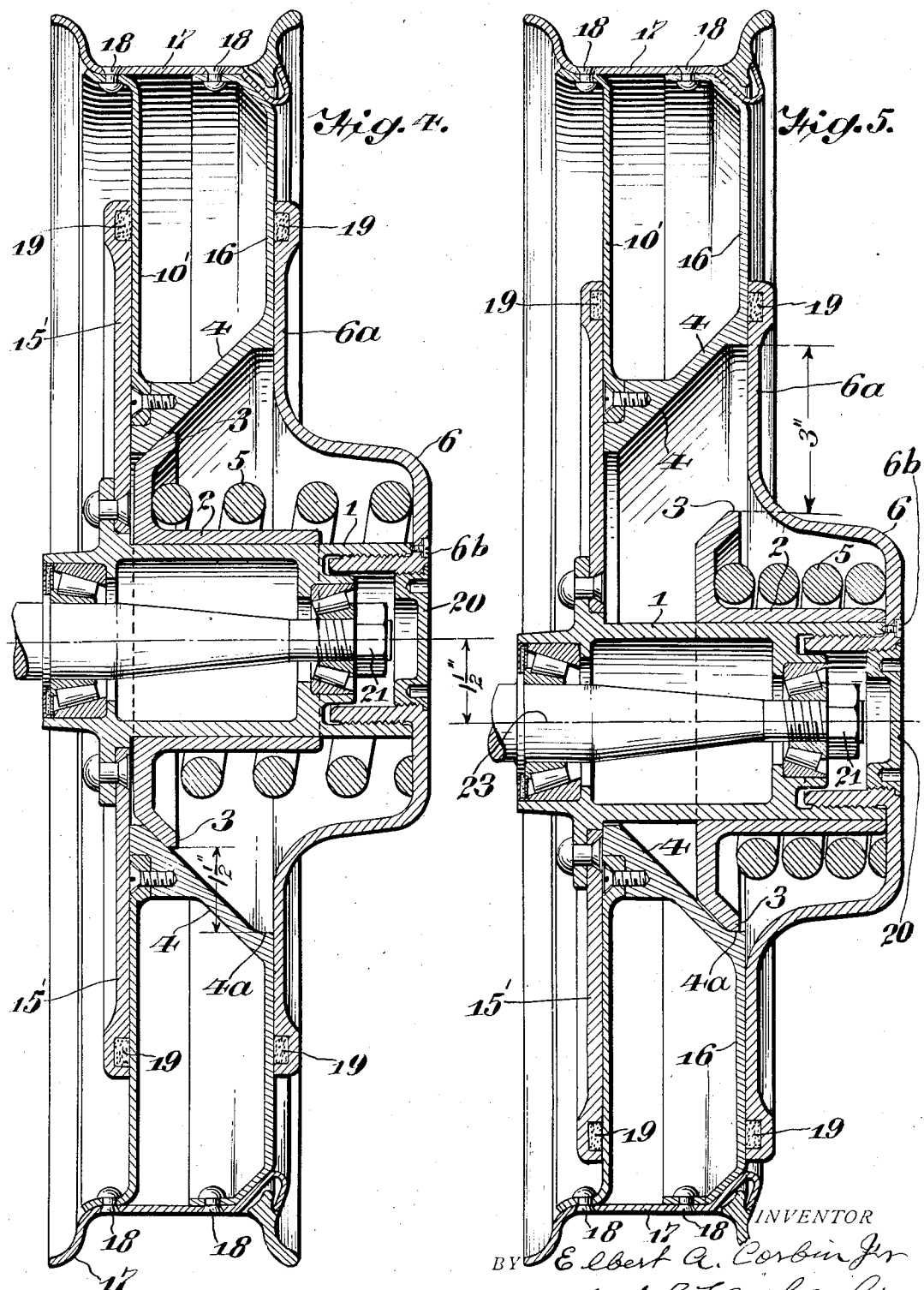

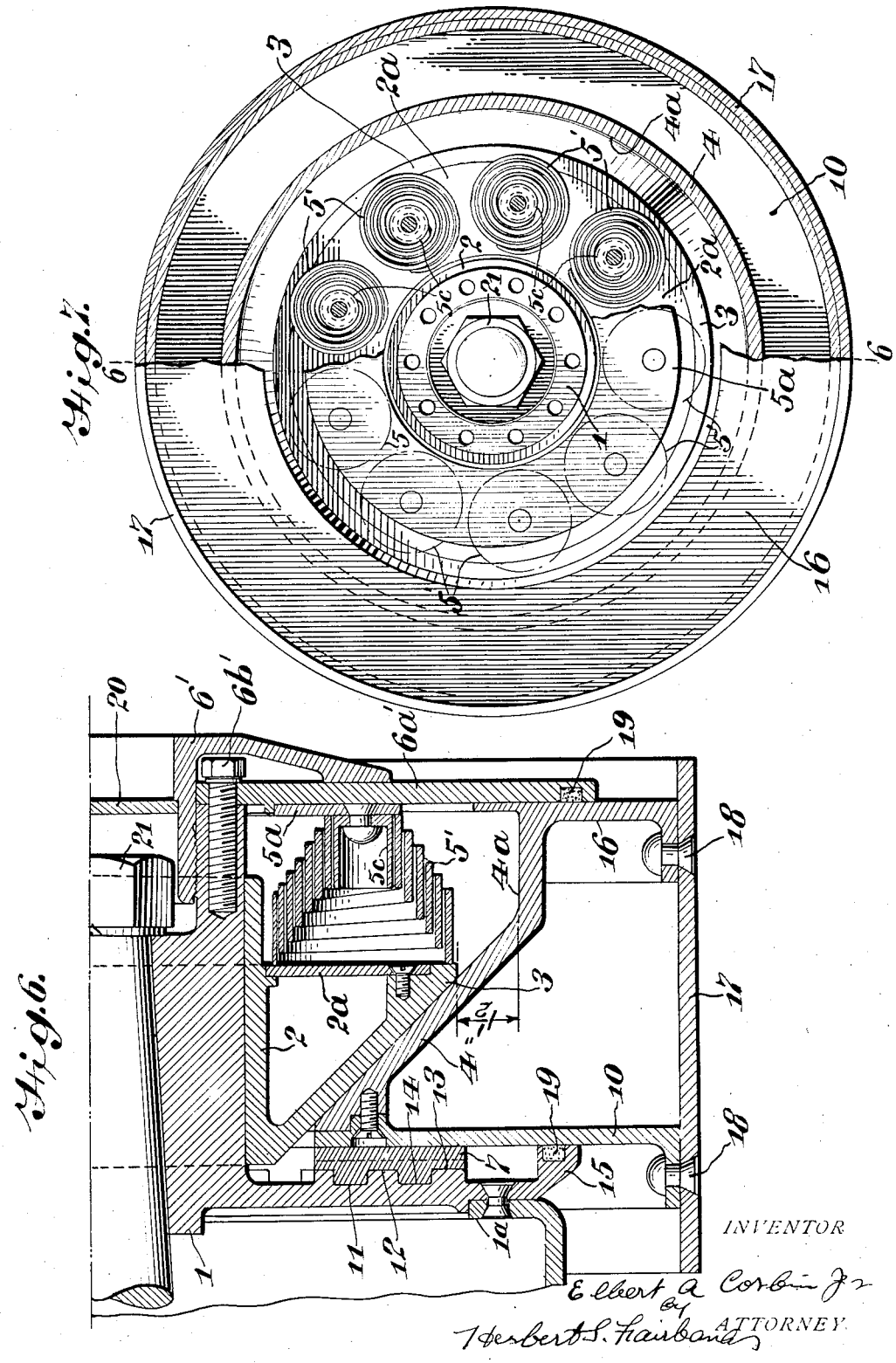

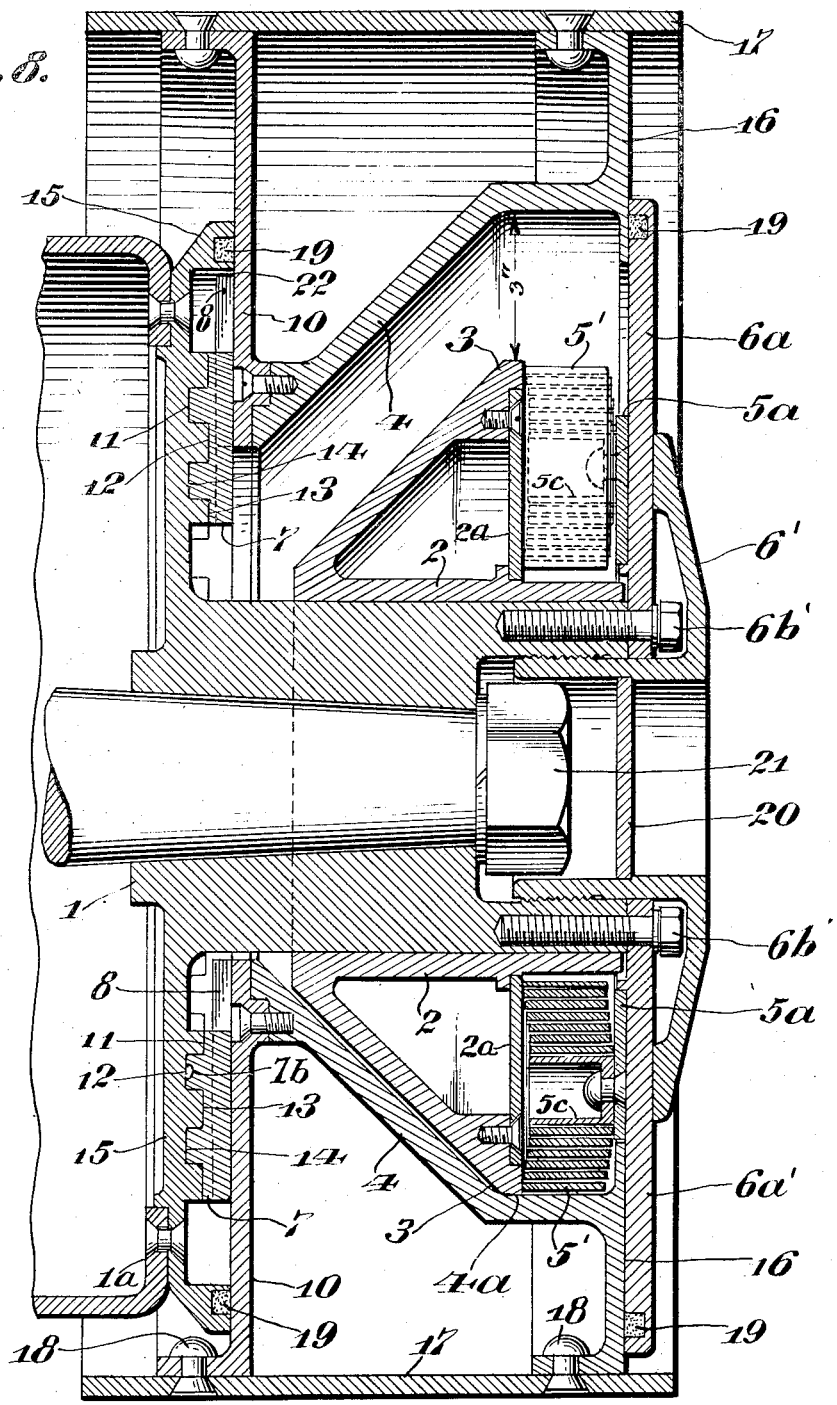

March 27, 1928.  1,664,389
E. A. CORBIN, JR
CUSHION WHEEL
Filed July 28, 1927    9 Sheets-Sheet 6
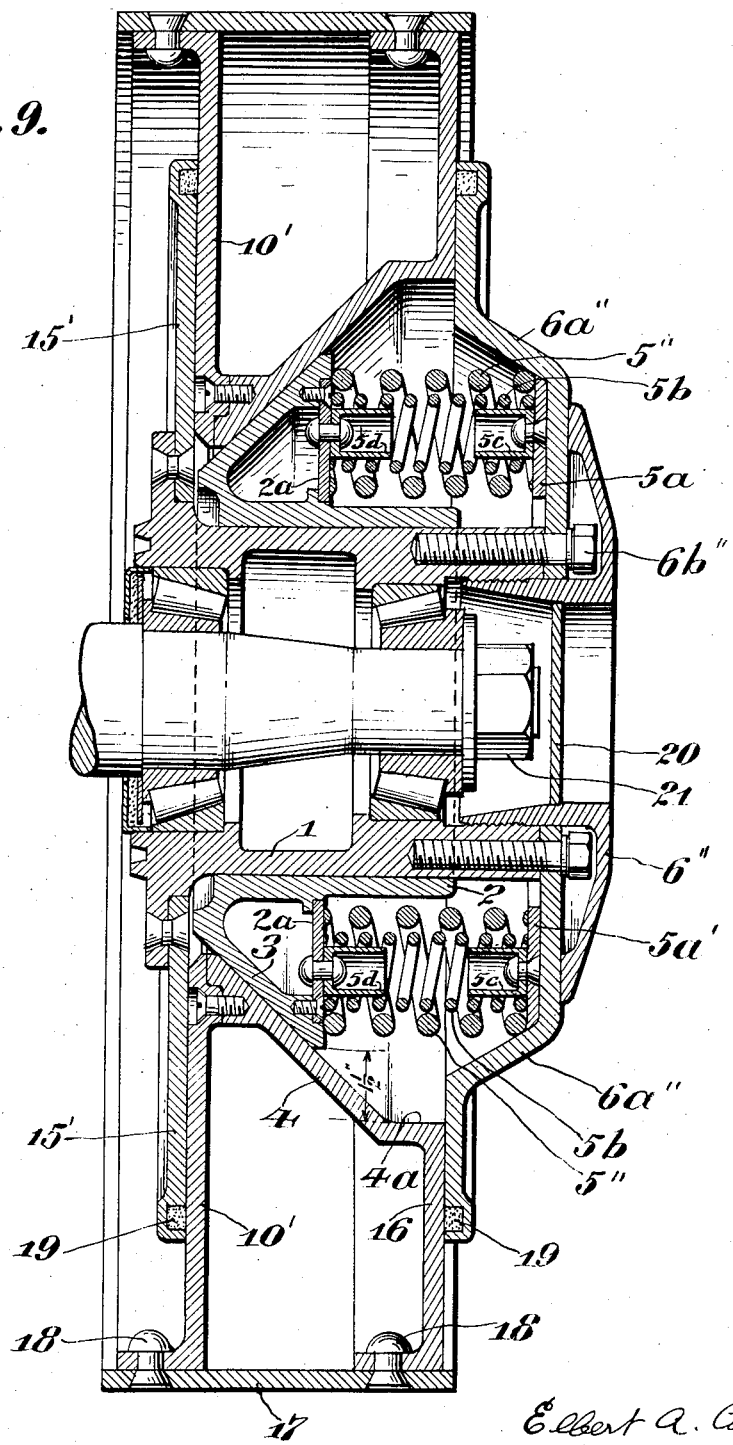
INVENTOR:
Elbert A. Corbin Jr
BY
Herbert S. Fairbanks
ATTORNEYS.

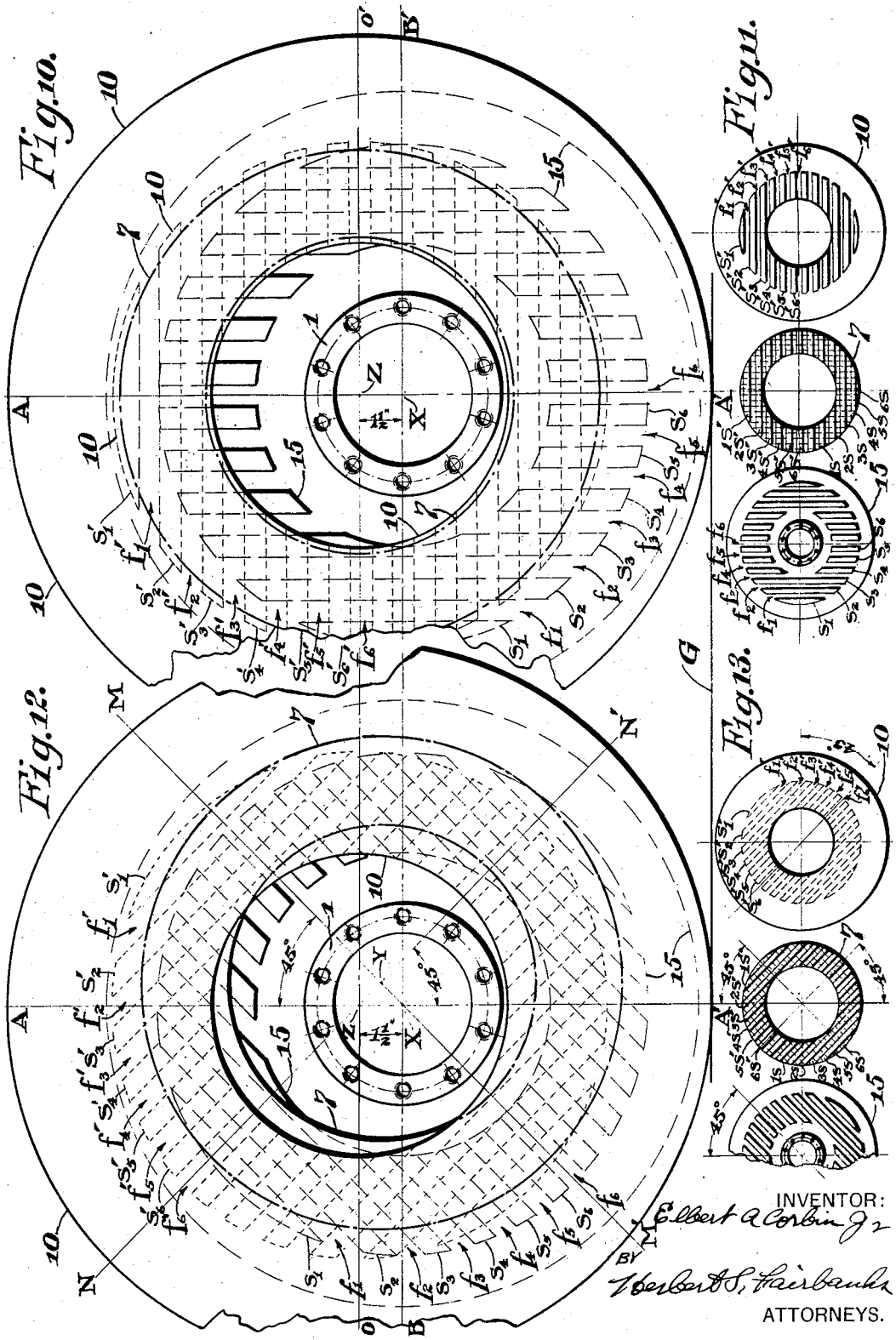

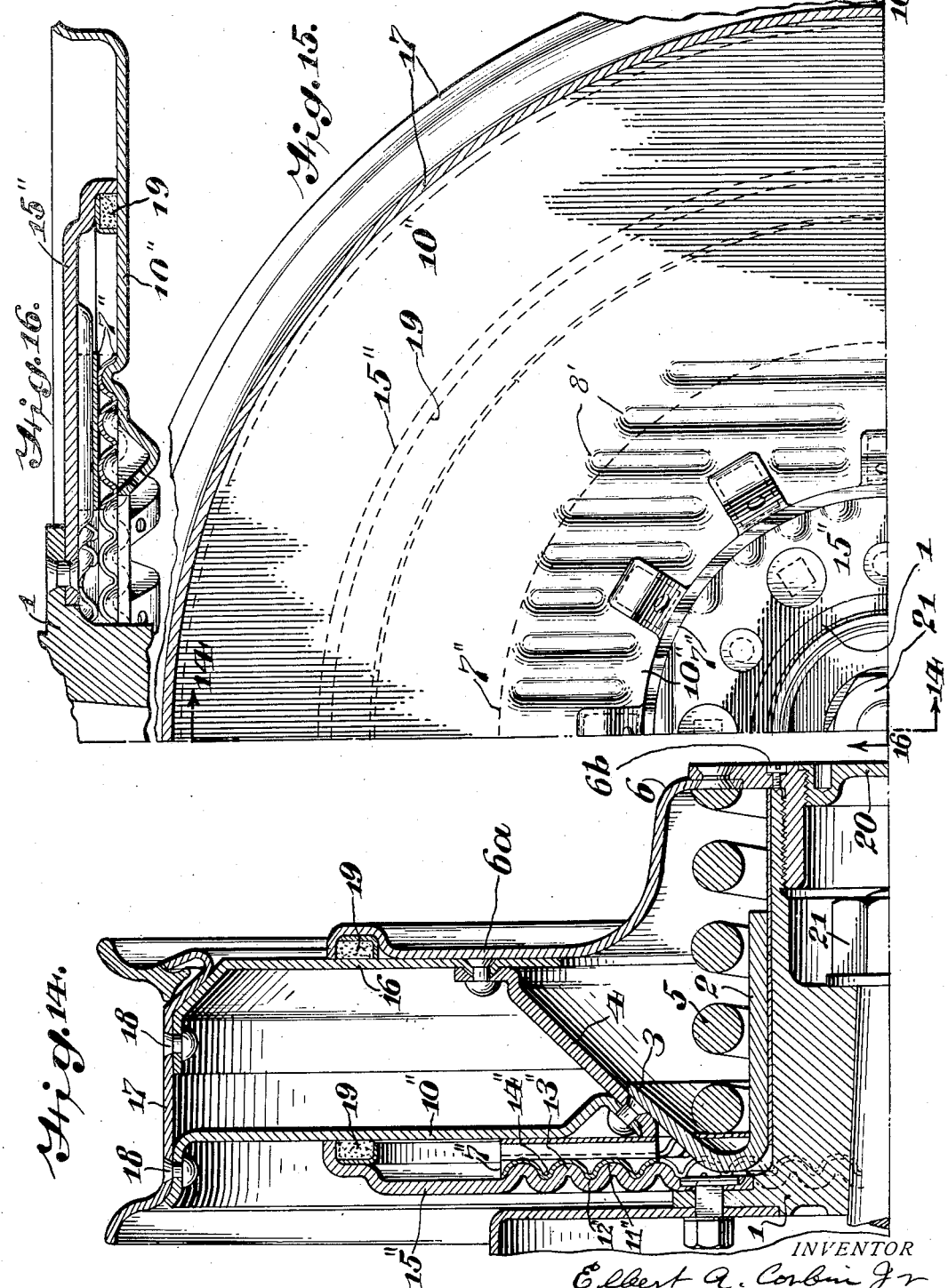

March 27, 1928.
E. A. CORBIN, JR
CUSHION WHEEL
Filed July 28, 1927
1,664,389
9 Sheets-Sheet 9
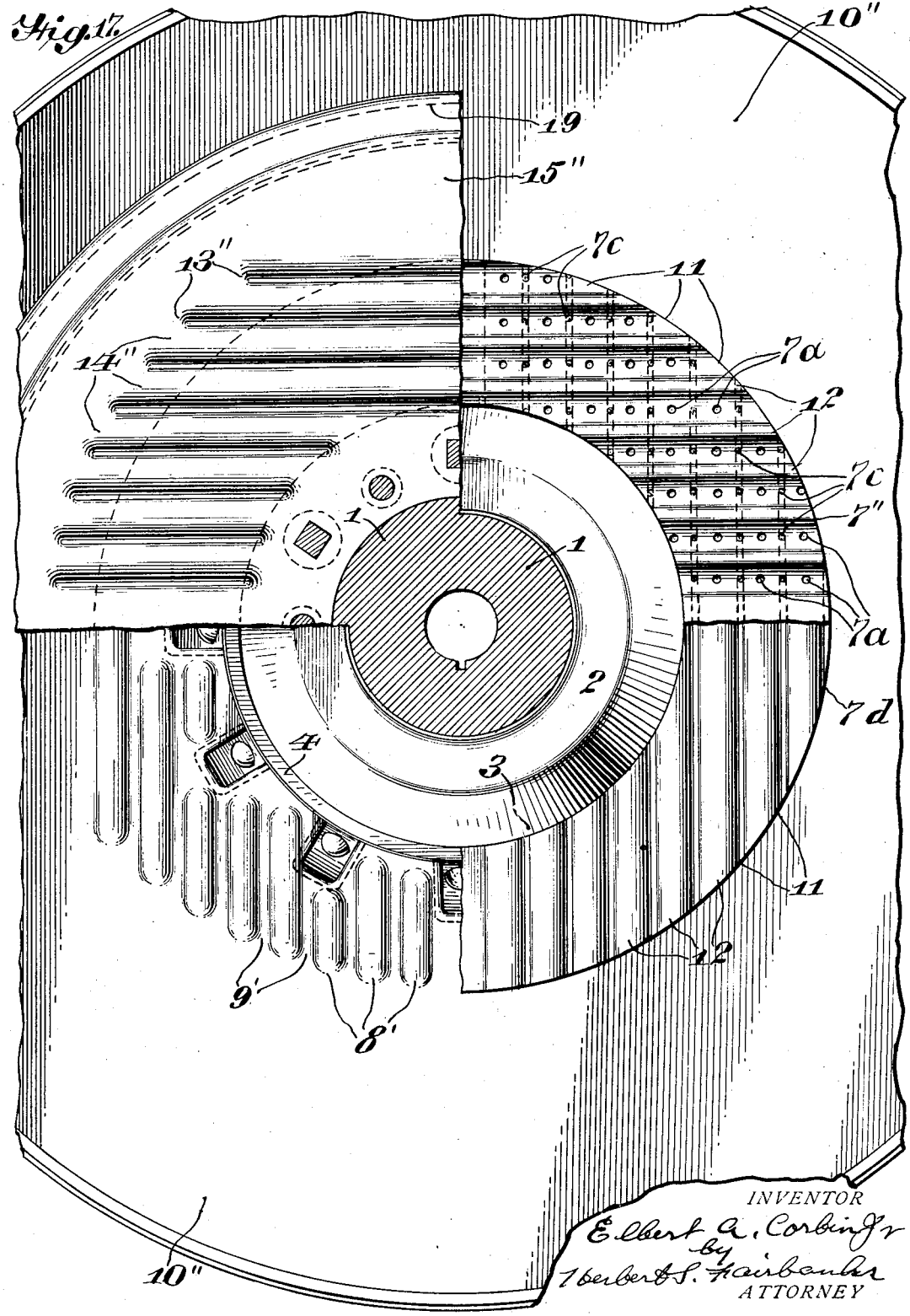

Patented Mar. 27, 1928.

1,664,389

UNITED STATES PATENT OFFICE.

ELBERT A. CORBIN, JR., OF SWARTHMORE, PENNSYLVANIA, ASSIGNOR OF ONE-THIRD TO WILLIAM C. BIDDLE, OF LANSDOWNE, PENNSYLVANIA, AND ONE-THIRD TO WILLIAM A. BROWN, OF PHILADELPHIA, PENNSYLVANIA.

CUSHION WHEEL.

Application filed July 28, 1927. Serial No. 209,104.

My invention relates to improvements to the general class of cushioned or resilient wheels in which the design of the wheel has been modified from the stiff spoke or disc wheel so as to give under road shock or load shock, thereby saving the tires and different parts of the mechanism of the vehicle from gradual disintegration on account of the application of these forces.

It has heretofore been proposed in this art to construct a wheel hub wherein a sleeve member is provided with a head slidably disposed with respect to one face of the body member and a spring-pressed cone was carried by the sleeve and was adapted to engage a conical socket on the body member. This construction was intended to be used with a wheel of the spoke type, and, owing to the stresses and strains inherent in its construction, it was adapted only for very light wheels or for vehicles traveling at slow speeds or of light construction. This is due to the fact that the construction was not properly balanced and the sleeve which was mounted on the shaft of the vehicle received the stresses and strains at one end only.

The torsional and other strains subjected to a construction of this character due to shocks and stresses incident to inequalities of road contact when used in conjunction with a motor driven vehicle such as, for example, trucks or busses, produces strains on the construction that materially reduce its life and a construction of this character is not a commercial product.

Furthermore, in a construction of this type, it is impractical to make the hub construction of the small diameter which is necessary for vehicle wheels of the types now used.

It is one object of my present invention to devise a novel resilient transmission or bearing for vehicle wheels wherein the vital objections hereinbefore specified have been overcome and wherein a compact and simplified construction of a resilient transmission or bearing can be produced in which the stresses and strains are compensated for and distributed so that no single part of the construction can receive any excessive strain.

A further object of the invention is to devise a novel wheel hub wherein a plurality of abutment members are provided within which a resilient thrust transmitting member is mounted, and wherein provision is made for the displacement of the hub when in use.

A further object of this invention is to interconnect the hub plate and the wheel proper in a novel manner so that the driving strains are properly distributed throughout the entire area of a novel driving ring.

A further object of this invention is to devise a novel wheel and hub construction which can be used either as a driving wheel or as a driven wheel.

A further object of this invention is to provide a resilient transmission or bearing in a device of this character wherein the brake drum can be directly connected with the hub.

A further object of this invention is to devise, especially for heavy duty vehicles, a resilient wheel construction wherein a multiplicity of springs are employed which are provided with a self-adjusting bearing member which compensates for localized pressure which would otherwise be present at each unit of the spring.

A further object of this invention is to provide novel means for making an effective seal between the moving parts to prevent the loss of lubricant.

A further object of this invention is to construct the wheel so that it can be removed as a unit of structure, without necessitating the dismantling of the wheel construction.

A further object of this invention is to greatly increase the length of driving surfaces over prior devices in order to substantially eliminate the heating of the parts through high specific pressure, and, in accordance with this invention, the driving engagement between the members is uniformly distributed over a very large area so that the driving strains are not localized.

A further object of this invention is to so construct the lubricant-containing chamber that all of the moving parts will be effectively lubricated due solely to the motion of the moving parts.

A further object of this invention is to design the construction in such a manner that the parts may be formed from sheet metal with a minimum cost of manufacture and a minimum weight of parts, although, if desired, certain of the parts can be made from forgings or castings.

A further object of this invention is to devise, in a heavy duty type, a novel skirt construction which is attached to the sleeve mounted on the hub to enable one to materially lighten the construction and still obtain the requisite strength to prevent deflection of the skirt under load and also to provide a seat for the multiplicity of springs used in heavy duty wheels.

A further object of this invention is to form the driving ring in a novel manner so that it can be made in one piece or of sections fastened together, either type being provided with lubricating ports.

A further object of this invention is to devise a novel construction of a heavy duty type resilient transmission or bearing, wherein a multiplicity of springs are circumferentially disposed and are provided with a novel reinforcement which prevents deformation of the pressure-resisting member. This positively prevents any leakage of the lubricant due to buckling or deformation of the outer spring abutment.

A further object of this invention is the elimination of irregular contours on both driving and load-carrying members, making it possible to turn or stamp these members, heat-treat them and grind them to accurate working surfaces.

A further object of this invention has been to provide an extraordinary amount of bearing surface between the bearing members which is possible because of the use of inner and outer abutment plates without any bolts connecting these abutments.

A further object of this invention is to provide a means whereby the action of the device is slowed up upon approaching its position of greater stress by means of a bowl, cone-shaped at the peak and curved in cross-section at the base forming into a cylinder parallel with the axis at the base, cooperating with a skirt of a reciprocating sleeve, cone-shaped and truncated at the peak and forming into a cylinder at the base with a smaller radius than that of the base of the bowl, said cylinder being parallel with the axis at said skirt base.

With the above and other objects in view, as will hereinafter more clearly appear, my invention comprehends a novel vehicle wheel embodying a resilient transmission or a resilient transmission and bearing or a resilient bearing.

For the purpose of illustrating my invention I have shown in the accompanying drawings forms thereof which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Fig. 4 is a section of a resilient bearing adapted to a front or undriven wheel in its unmoved position.

Fig. 5 is the same section as Fig. 4, but shown at its ultimate deflected position with the correlated parts assuming their ultimate stations under road or load shock.

Fig. 6 is a half section through line 6—6 of Fig. 7 showing a resilient transmission or bearing adapted to a heavy construction for large vehicles in concentric or unmoved position.

Fig. 7 is a front elevation of Fig. 6, on a smaller scale, with certain outboard members removed.

Fig. 8 is a sectional view taken on line 6—6 of Fig. 7, being the same as shown in Fig. 6 only in a deflected position, the correlated parts having assumed their ultimate location when under thrust of either road or load shock.

Fig. 9 is a resilient bearing adapted to an undriven or front wheel for heavy duty vehicles shown in section and in concentric or unmoved position.

Fig. 10 is a diagrammatic view of the driven parts of a resilient transmission or bearing with the wheel splines parallel to the ground line and the hub splines perpendicular to the ground line G.

Fig. 11 shows the three driving members in an exploded view of the relative position shown in Fig. 10.

Fig. 12 is a diagrammatic view of the driving parts of a resilient transmission or bearing with wheel splines and hub splines both at 45° to the ground line G.

Fig. 13 shows the three driving members in an exploded view of the relative positions shown in Fig. 12.

Fig. 14 is a resilient transmission or bearing cut on line 14—14 of Fig. 15, showing a modification in method of manufacture of Figs. 1 and 2.

Fig. 15 is a front elevation of Fig. 14 with certain outboard parts removed for clarity.

Fig. 16 is a fragmental section taken on line 16—16 of Fig. 15.

Fig. 17 is an inboard fragmental elevation of Fig. 14 showing a quadrant of the hub flange, the inboard half of the driving ring, the outboard half of the driving ring and the wheel plate.

Similar numerals of reference indicate corresponding parts in all figures. Referring to the drawings:—

Figure 1:
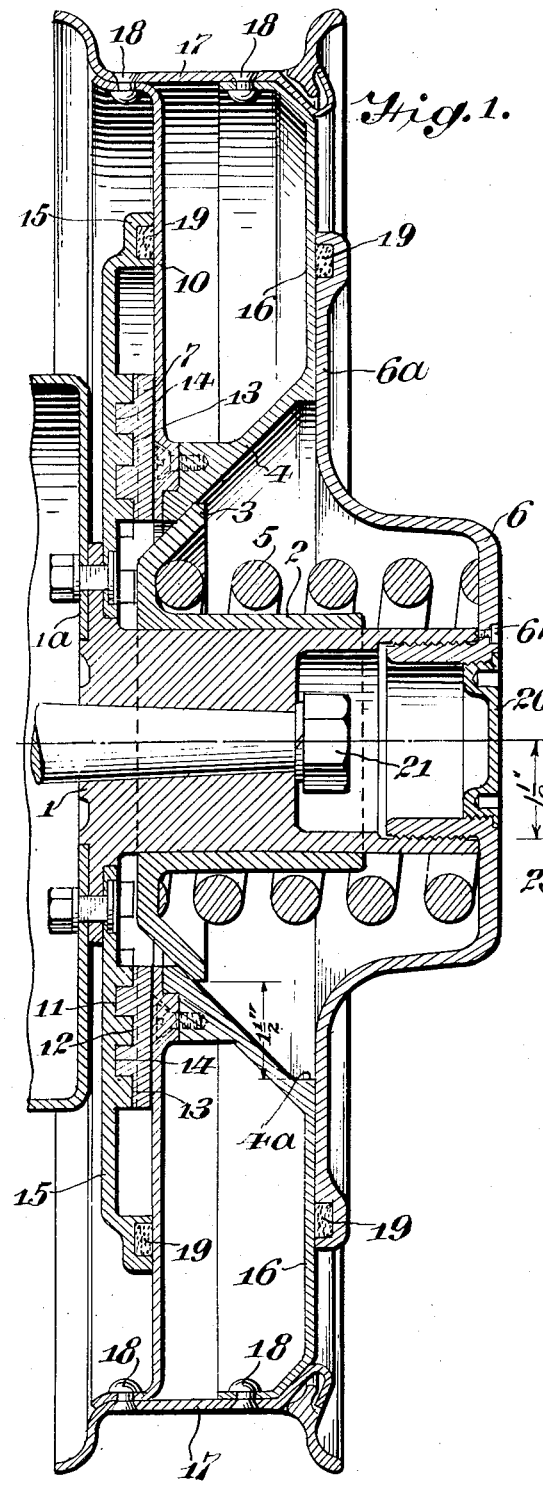
Fig. 1 represents a vertical, sectional view of a resilient transmission or bearing adapted to a rear or driven vehicle wheel, the section being taken on line 1—1 of Fig. 3.

1 represents a hub upon which reciprocates a sleeve 2 having a collar or skirt 3 preferably at 45° with the axis of the hub 1 and supported concentrically when at rest within the cone-shaped bowl 4 by the spring 5 which in turn presses against the hub cap 6 which is screwed within the outboard end of the hub 1. The bowl 4 is cone-shaped at the peak and curved in cross section at the base forming into a cylinder parallel with the axis at the base and cooperates with the skirt 3 of the reciprocating sleeve 2 which is cone-shaped and truncated at the peak and forming at the base into a cylinder with a smaller radius than that of the base of the bowl, said cylinder being parallel with the axis at said skirt base, which construction provides a positive means for slowing up the action of the device upon approaching its position of greatest stress.

The driving ring 7 meshes with the splines 8 and the flutes 9 of the wheel disc 10 on the ring's outboard side while the flutes 11 and the splines 12 of the driving ring 7 mesh with coacting splines 13 and flutes 14 of the hub flange 15. The driving ring 7 and the other driving rings herein disclosed are preferably made of bronze or other suitable wearing material. The disc 16, which is part of the cone-shaped bowl 4, and the disc 10 support the tire rim or band 17 and they are attached thereto by the rivets 18. The hub nut flange or abutment 6ᵃ and the hub flange 15 are gasketed at their periphery with the packing 19 to retain the grease or oil used as lubricant within the wheel. The closing plate 20 is used to cover the nut 21 which holds the wheel to the axle.

Figure 2:
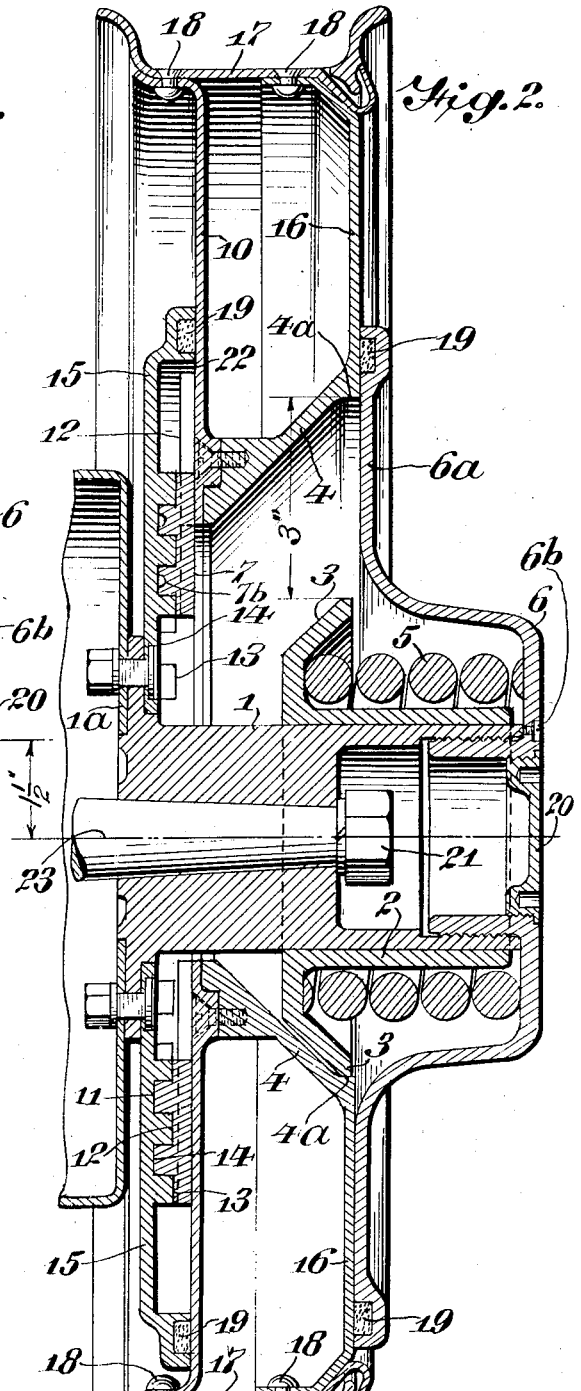
Fig. 2 represents a sectional view taken on line 1—1 of Fig. 3, of a resilient transmission or bearing as adapted to a vehicle wheel with full compression having taken place within the wheel and all correlated parts having assumed their ultimate position.

In Fig. 1 it will be seen that the distance between the outside diameter of the skirt 3 on the sleeve 2 and the inside diameter of the bowl at point 4ᵃ is shown for the purpose of illustration larger by substantially 1½″ on each side or 3″ overall in which the skirt 3 can move up and down upon the cone-shaped bowl 4. In Fig. 2 it will be seen that in the deflected position in which the wheel is shown, this 1½″ space has been entirely taken up by road or load shock and the space upon the opposite side away from the ground has now grown to be 3″. In other words, the parts 4 and 3 have come together on the ground side of the wheel at the point 4ᵃ while the point 4ᵃ and the skirt 3 are 3″ apart on the upper side of the wheel. The spring 5 has been closed together against the hub nut 6 by the skirt 3 riding down the cone-shaped bowl 4. In this position, the ring 7 with its inboard splines and flutes parallel to the ground, remains with the hub flange, the splines 12 closing up the space at the upper side of the ring, as shown at 22 in Figs. 2 and 8.

In Figs. 1 and 2, it will be seen that the floating parts of the wheel formed by the discs 10 and 16 and attached to the rim 17 are held within the abutments 15 and 6ᵃ. The abutment 6ᵃ, being rigidly attached to the end of the hub 1 by the screws 6ᵇ or their equivalent, becomes a second hub plate similar to the flange 15, thereby equalizing the construction for side thrusts and allowing the wheel portion to float freely within these two abutments. It is advisable to use some means, 6ᵇ, to lock the outboard abutment 6ᵃ to the sleeve or hub 1 of the inner member, as otherwise if relative movement takes place leakage of lubricant is liable to occur and if this abutment plate 6ᵃ is loosened to such an extent that it becomes removed, the wheel will become disassembled. This is applicable to all types of construction shown.

It will be noted that the driving ring 7 is fluted and splined in such a manner that it can coact with similar flutes and splines upon the hub plate 15 and the wheel disc 10, so that there may be large areas of impinging surfaces which reduce specific pressures to a minimum and for this reason can be used under any load conditions whatever.

It will be seen that it is easy to apply brake drums, as shown at 1ᵃ, to the hub without interfering in any way with the deflecting motion of the wheel member. It will also be seen that the packing rings 19 not only make an effective seal between the moving parts to prevent loss of lubricant, but act as a mild lubricator themselves between the inboard and outboard abutments and the wheel discs 10 and 16, effectually covering the coacting surfaces with a film of lubricant and pushing back, during the action of the wheel, silt, grit and other improper substances from the inner working parts of the wheel.

It will also be noticed that by removing the cap 20, the entire structure can be immediately dismounted from the spindle by removing the nut 21 without in any way dismantling the wheel construction.

It will also be seen that the chamber formed by the members 6ᵃ, 4, 2 and 1 makes a small compact container for the lubricant and the lubricated parts are enabled to thoroughly churn up the lubricant contained within it so that all of the lubricant is disturbed and used from time to time by the action of the device.

It will also be seen that the center line of the hub members in Fig. 2 is substantially 1½" below the hub members of Fig. 1 as shown at point 23. It will be seen in the construction shown in Figs. 1 and 2 that the coacting sleeve and cone-shaped bowl act as a shock absorber and, on account of their shapes, as a rebound dampener and give an indirect spring suspension as all blows are at right angles with the ground and are taken in a direction parallel with the hub and absorbed in the spring 5.

Figure 3:
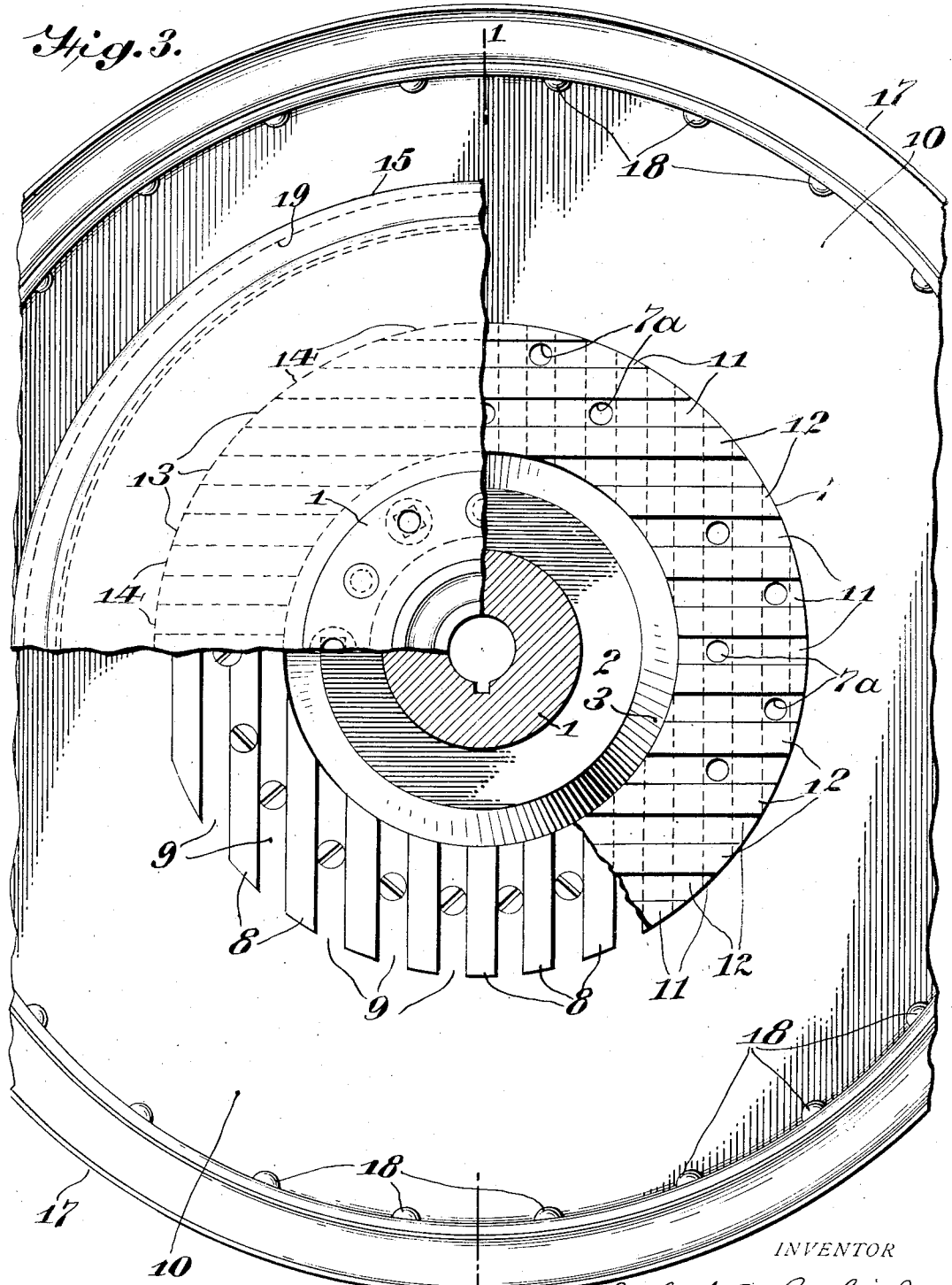
Fig. 3 is an inboard elevation of Figs. 1 and 2 with one-quarter shown in full elevation and the remaining three-quarters divided, one-half showing driving ring elevation and the other half showing inside wheel disc.

In Fig. 3 the ring 7 is shown in partial elevation and it can be seen that the entire area of both sides of this ring is formed into flutes 11 and splines 12 which coact and mesh with the splines 13 and the flutes 14 of the member 15 and the splines 8 and the flutes 9 of the member 10. The holes $7^a$ shown in the ring 7, or their equivalent $7^b$ shown in Figs. 2 and 8, are to interconnect the lubricant which is disposed on each side of the ring and causes free lubrication of the flutes and the sides of the splines within which they are located. It is quite evident from Fig. 3 that the coacting surfaces of the three members shown therein are, in their aggregate, a large area, much larger than has ever been contemplated in the past in a mechanical action of this kind. Without constricting the action of the wheel in any way, the splines 8 can be lengthened beyond the circle shown in Fig. 3 and will give even additional area if it is desirable.

In Fig. 4 which shows the front wheel in concentric or unmoved position, the skirt 3 of the sleeve 2 is shown in contact with the hollow cone-shaped member 4, the contour of the skirt 3 and the cone-shaped member 4 of Fig. 4 being similar to and functioning identically as the skirt 3 and member 4 shown in Figs. 1 and 2. The driving ring 7 and the coacting splines 8 and flutes 9 have been omitted and the inboard wheel disc 10′ acts directly upon 15′ without any intervening member.

Fig. 5 shows the deflected or eccentric position which the front or undriven wheel assumes when at its ultimate deflected position and the point $4^a$ and the skirt 3 are together.

The lubricant chambers in Figs. 4 and 5 are identical with the lubricant chambers in Figs. 1 and 2 and all other conditions are the same as in Figs. 1 and 2 except that Figs. 4 and 5 are not sections of a resilient transmission but are sections of a resilient bearing. The inner abutment 15′ and the outer abutment $6^a$ perform the same functions as the abutments 15 and $6^a$ shown in Figs. 1 and 2, taking the side thrusts, containing the packing rings 19 and holding the mechanism rigidly at right angles to the hub 1 and thereby permitting their use in any type of vehicle, regardless of the load.

Fig. 6 is a half section on line 6—6 of Fig. 7 in which is shown a multiplicity of springs 5′ surrounding the hub 1. This view shows the sleeve 2 with its skirt or flange 3 in a concentric position to the cone-shaped bowl 4, the contour of the skirt 3 and the cone-shaped member 4 of Fig. 6 being similar to and functioning identically as the skirt 3 and member 4 shown in Figs. 1, 2 and 4. It will be seen that the springs 5′ are provided with a self-adjusting bearing ring $5^a$ which compensates for localized pressure which would otherwise be present at each unit of the spring, and allows free movement upon the plate $6^a$ and makes an entity of the multiplicity of springs. The dowel $5^c$ which is attached to the freely movable spring bearing member $5^a$ acts to maintain the position of the spring 5′.

It will be seen that the sleeve 2 and its skirt 3 in Fig. 6 are reinforced by the inboard spring support plate $2^a$ which helps the skirt 3 support the thrust of the superimposed weight against the member 4 and acts as a seat for the springs 5′ when they thrust against the bowl 4. It will be seen that the member 6′ which is attached to the hub 1, reaches out and reinforces the flange $6^{a\prime}$ and enables it to withstand the thrust of the springs 5′, thereby preventing the plate $6^{a\prime}$ from being deformed and emitting lubricant through the packing 19 at the periphery of $6^{a\prime}$. It is advisable to use some means, $6^b$, to lock the outboard abutment $6^a$ to the sleeve or hub 1 of the inner member, as otherwise if relative movement takes place leakage of lubricant is liable to occur and if this abutment plate $6^{a\prime}$ is loosened to such an extent that it becomes removed, the wheel will become disassembled. This is applicable to all types of construction shown. The different parts and their functions as shown in Fig. 6 are substantially identical with those shown in Figs. 1 and 2 and are merely reinforced with the above mentioned features for heavy duty work.

Fig. 7 is an elevation of Fig. 6 drawn on a smaller scale to show the relative positions of the springs and their component parts. It is evident that by the use of the inner and outer abutments $6^{a\prime}$ and 15′ and the elimination of any peripheral connection by bolts between these two members, the angular supporting elements 3 and 4 can be made with a large diameter to enable the device to house a large group of springs and still be within the limits of commercial wheel diameters. In getting a diameter large enough to enclose a group of springs such as shown in Figs. 6, 7 and 8, it is possible to enlarge the diameter of the shirt 3 and the bowl member 4 to give a large contacting surface between these two members, which is imperative when the device is used under heavy load. It is also evident that the use of the inner and outer abutment plates, without the interconnecting bolts, admits of this construction within a small area. This is particularly important in view of the present day use of small diameter wheels on motor vehicles and the like.

Fig. 8 is a section on line 6—6 of Fig. 7 and is the same device as shown in Fig. 6 but deflected to the ultimate possible position, the springs 5' having been compressed and the point 4$^a$ and the skirt 3 being brought together at the ground side of the wheel, while the point 4$^a$ and the shirt 3 are 3" distant from each other on the upper side of the wheel.

Fig. 9 shows an undriven heavy duty resilient transmission or bearing with the driving ring 7 eliminated and has the same features of advantage as enumerated for Figs. 4 and 5 with the additional advantages of construction as enumerated in Figs. 6, 7 and 8 for heavy duty service. It will be noted that the springs 5" are augmented by inner springs 5$^b$, thereby increasing the pressure exerted by the springs 5" without taking up any additional space and acting as pilots to each other in case of fracture. The dowel 5$^c$ is attached to the freely movable ring 5$^{a'}$ and performs the same functions as in the driven wheel shown in Fig. 6. The dowel 5$^d$ which is attached to the inboard spring supporting plate 2$^a$ performs the same functions as the dowel 5$^c$ in Figs. 6, 7, 8 and 9. The outer abutment plate 6$^{a''}$ is reinforced by the member 6", similarly as shown in Figs. 6, 7 and 8, which stiffens this member to resist the thrust of the springs 5" and 5$^b$ in addition to load shock. It will be evident that the mounting or demounting of the heavy duty resilient transmission or bearing shown in Figs. 6, 7, 8 and 9 can be done in their assembled state by merely removing the member 6 and the nut 21, the same as in the light duty resilient transmission or bearing.

In order to get a clear understanding of the reciprocal action of the driving ring and its coacting plate members, it is necessary to show the diagrammatic Figures 10, 11, 12 and 13. The driving members of my resilient transmission are entirely independent of the load carrying members and are three in number. They consist of a driving ring 7, which is splined and fluted on both sides, the splines on the inboard side being at 90° with the splines on the outboard side, or vice-versa. The side walls of the splines form flutes which coact with the splined elements of the two members 15 and 10, known as the hub flange and the wheel plate or bowl plate. The hub flange 15 is splined and fluted to mate with the inboard side of the driving ring 7 and the bowl plate 10 is splined and fluted to mate with the outboard side of the driving ring 7.

The side walls of these splines, it will be seen, form the sides of the flutes, or, vice-versa, the sides of the flutes form the sides of the splines. The driving ring is subjected to two kinds of pressure. Firstly, it takes the thrust of the spring or springs situated around the hub which supports the weight of the vehicle and all road shocks. Secondly, it takes the torque of acceleration or deceleration when power or brakes are applied to the wheel. These three members without the spring or springs surrounding the hub would not support their own weight and are employed only as driving members as they move freely and are constantly submerged in lubricant.

On account of the large area of the driving ring, the surfaces of the walls of the flutes and sides of the splines are subject to very light specific pressures when torque occurs, so that this area will last indefinitely in service. The operation and functioning of these three members is described herewith. The driving ring 7, the hub flange 15 and the wheel plate 10 when at rest are concentric with each other and are constantly thrown into eccentric position by load shock and road shock. Referring to Figs. 10 and 12, the driving ring 7 is shown with two concentric circles in heavy dot and dash, the spline and flute lines being omitted entirely for clarity, but it will be understood that they would coincide, if shown, with the spline and flute lines shown in the hub flange 15 dashed and the spline and flute lines shown in the wheel member 10 dotted.

Referring to Figs. 10 and 11, the hub member 15 having the splines $s^1$, $s^2$, $s^3$, $s^4$, $s^5$, $s^6$, etc. are at right angles to the ground line G, the driving ring 7 with its splines $1^s$, $2^s$, $3^s$, $4^s$, $5^s$, $6^s$, etc. sliding in the flutes $f^1$, $f^2$, $f^3$, $f^4$, $f^5$, $f^6$, etc. of the hub flange 15 moves from its center at $x$ to a new center $z$ when force is applied at A' in the direction of A and is carried together with the wheel member 10 to the new center $z$. In the position shown in Figs. 10 and 11, the splines of 10 are parallel to the ground and therefore there is no movement possible between 7 and 10 and the entire road shock is carried along the line A'—A.

The splines of the driving ring 7 on its outboard side, numbered $1^{s'}$, $2^{s'}$, $3^{s'}$, $4^{s'}$, $5^{s'}$, $6^{s'}$, etc. mate into the flutes $f'^1$, $f'^2$, $f'^3$, $f'^4$, $f'^5$, $f'^6$, etc. on the wheel member 10. The splines $s'^1$, $s'^2$, $s'^3$, $s'^4$, $s'^5$, $s'^6$, etc. of wheel member 10 mate in the flutes formed on the driving ring 7 by the adjacent walls of the splines $1^{s'}$, $2^{s'}$, $3^{s'}$, $4^{s'}$, $5^{s'}$, $6^{s'}$, etc.

If the wheel was rotated 90° from the position shown in Fig. 10, the driving ring 7 would then become locked to the hub member 15 and the movement would be entirely along the line B'—B when the road shock hit the wheel at B in the direction of B' and the ring 7 would remain immovable on the hub flange 15 and move together with it along the line B—B'.

In Fig. 12 the wheel has been rotated 45° from the position shown in Fig. 10 and A—A' axis is now at M—M' and B—B' is now at N—N', a shock at A' will now cause the ring 7 to move along the axis M—M' 45° to the ground line G until its center is at $y$, while simultaneously the wheel plate 10 will slide upon the driving ring 7 along the axis N—N' also at 45° to the ground line G but at 90° to M—M' until its center reaches the point $z$. The hub member 15 has its center at $x$, the driving ring 7 moves until its center is at $y$ and the wheel member 10 moves until its center is at $z$ along the line A—A' making the full movement of substantially 1½" from $x$ to $z$ which is the maximum movement permitted by the design of the wheel and is designated by the line O—O'. This 1½" movement has been found in practice to be sufficient for any diameter of wheel or weight of vehicle.

It will be seen from the foregoing that any position assumed by the wheel between the two positions shown will bring about a proportionate correlative change in location of the parts 7, 15 and 10, so that there is an even readjustment of position of the three coacting parts at all times no matter how great the torque may be, how rapid the rotation may be or how intense the road or load shock may be.

When the parts 7, 15 and 10 have reached their ultimate movement at $y$, $x$ and $z$ and still further road or load shock is exerted, the wheel goes on supporting the thrust as an ordinary stiff wheel, with the advantage of having dampened out the greater part of a shock that might otherwise have proved destructive to the conventional stiff wheel.

This mechanism supplies an indirect spring suspension, a shock-absorber, a rebound dampener or snubber, and a torque cushion, all inbuilt and part of the wheel structure. The only unsprung weight in the wheel is that portion supporting the tire which is mounted upon the member 10. The splines and flutes of the members 7, 15 and 10 are always in engagement and give a positive drive in any position with regard to the road through 360° rotation, with any varying road or load shock and in any deflected or eccentric position the three members may assume, or with any combination of the above conditions whatsoever. The wheel functions without noise or vibration as all movements are supported and cushioned by the spring or springs around the hub.

Fig. 14 shows a reproduction of a light duty resilient transmission or bearing of the driven type in which the various members shown in Figs. 1, 2 and 4 are reproduced in stamped metal parts where feasible, to make a cheaper and lighter construction, their function and general conformations being the same as shown in Figs. 1, 2 and 4. The heavy class of resilient transmissions or bearings can be reproduced in the same manner as shown in Fig. 14, their different elements being formed out of steel stampings for the sake of lightness and cheapness of manufacture. It will be seen that the inboard and outboard abutments perform the same duties as shown elsewhere, and keep the wheel at right angles with the hub member regardless of the direction from which it receives its shock.

The driving member 7" may be made of two identical stampings, from the same dies if necessary, and may be spot-welded or otherwise permanently joined together. The flutes and splines are formed to engage the flutes and splines in the parts 15" and 10". It is unnecessary to have through bolts in the stamped steel parts between the abutments 10 and 16, the disadvantages of which are self-evident.

The Fig. 15 is an elevation with the plate 16 and bowl 4' and all other outboard parts removed for clarity.

Fig. 16 is a partial section taken at right angles to the section shown in Fig. 14 on line 16—16 of Fig. 15 and is shown to clarify the position of the different flutes and splines formed in the stampings and to show their correlation with one another.

In Fig. 17 it will be seen that the splines 13" and the flutes 14" of the hub plate 15" as well as the splines 8' and the flutes 9' of the wheel plate 10", are similar to the flutes and splines shown in Fig. 3 and perform the same functions. The two integral parts of the driving ring 7"', shown in Fig. 17, have coacting contiguous surfaces that mate with the splines and flutes of the plates 10" and 15", the inboard half of the driving ring 7"' being shown above and the outboard half of the driving ring 7"' being shown below at $7^d$. The vent holes for lubricant, $7^a$, are the same as those shown in Fig. 3. The corresponding parts in the different figures of the drawings have been given the same reference characters and where the construction of a part is varied the reference characters have been primed. These two integral parts of the driving ring 7"' may be spot-welded or otherwise permanently joined together equidistantly all over at the points $7^c$.

In all figures the screws or bolts $6^b$ or their equivalent are used to rigidly station the outer abutment plate upon the hub member 1, after final assembly.

It will be apparent that in accordance with this invention, when used as a transmission or a transmission and bearing, there is a continuous torque on the driven members which eliminates any lash on reversal of the torque such as takes place with a sudden shock or braking action on the wheel.

Special attention is directed to the fact that in accordance with this invention the frictional engagement between the two supporting members of the vehicle wheel is such that at its position of highest stress, the cooperating curved surfaces which merge into the conical and cylindrical surfaces serve to progressively restrict and retard the maximum movement of the parts and thus absorb the shock which would otherwise be present under such conditions. This causes a gradual building up of frictional resistance which overcomes the liability of any of the parts to become broken or distorted under abnormal shocks or stresses.

In all the embodiments of the invention herein shown there is a frictional connection between the inner and outer supporting members of the vehicle wheel.

In all the embodiments of my invention herein shown wherein a power transmitting action takes place such as in a driving wheel, the driving engagement is of such a character that the total length of the driving element is of a greater length than the diameter of the inner member and this driving means is distributed over substantially the entire side walls of the intermediate driving element.

In all the embodiments of my invention herein disclosed I have eliminated all irregular contours and the cooperating transmission and bearing surfaces can all be accurately machined and ground as they form plane surfaces.

In so far as I am aware I am the first in the art to devise a resilient transmission and bearing or a resilient transmission or a resilient bearing for vehicle wheels of the type herein disclosed wherein the driving and driven members are capable of eccentric displacement when in use and at the same time are maintained in accurate alignment to increase the stability of the construction and provide for effectively sealing the lubricant, with resilient means tending to maintain such members in axial alignment and at the same time to permit of their eccentric displacement, and wherein when used as a transmission or a transmission and bearing the total length of the splines on each face of the intermediate power transmitting element is materially increased over the greatest diameter of the inner member and, in practice, over substantially the entire area of side walls of the inner member, and I, therefore, desire to have my claims to such features receive a broad and generic interpretation.

The foregoing features are essential in a vehicle wheel of this type in order to produce a practical and commercial vehicle wheel, and provide for the uniform distribution and compensation of the stresses and strains to which the various parts of the vehicle wheel are subjected when in use.

With my novel construction, the number of springs employed can be materially increased, so that a heavy duty type of vehicle wheel capable of carrying any desired load can be manufactured having inherent in it the various advantages herein set forth.

In all the embodiments herein shown, the wheel can be removed as a unit of structure.

I am not limited to the size of vehicle wheel, since, owing to the elimination of through bolts, it is not necessary to provide the extra space required for their accommodation.

It will now be apparent that I have devised a novel and useful construction of a resilient transmission, a resilient transmission and bearing and a resilient bearing for vehicle wheels which embodies the features of advantage enumerated as desirable in the statement of the invention and the above description, and while I have in the present instance shown and described preferred embodiments thereof which have been found in practice to give satisfactory and reliable results, it is to be understood that the same are susceptible of modification in various particulars without departing from the spirit or scope of the invention or sacrificing any of its advantages.

Having thus described my invention, what I claim as new and desire to secure by Letters Patent, is:—

1. A resilient transmission for vehicle wheels, comprising two revoluble members capable of eccentric displacement, an intermediate power transmitting element slidably engaging said members and splined thereto throughout the area of such engagement, and resilent means tending to maintain the axial alignment of such members.

2. A resilient transmission for vehicle wheels, comprising two revoluble members capable of eccentric displacement, an intermediate power transmitting element slidably engaging said members and splined thereto throughout the area of such engagement, said element having free longitudinal movement with each of said members, with the direction of movement with one member at an angle to the direction of movement with the other member, and resilient means tending to maintain the axial alignment of such members, one of said members forming an inboard and an outboard bearing with the other member to maintain their alignment during eccentric displacement.

3. A resilient transmission for vehicle wheels, comprising two revoluble members at all times in bearing engagement with each other and capable of eccentric displacement, an intermediate power transmitting element in driving connection with each of said members by means of a plurality of splines which are arranged in rows which extend in the same direction on one face and on the opposite face at an angle to the direction of the splines on the first face, and resilient means tending to maintain the axial alignment of said members.

4. A resilient transmission for vehicle wheels, comprising an outer member having a plurality of spaced abutment plates and an inner conical socket, an inner member having a hub provided with a hub flange in sliding engagement with one of the plates of the outer member, an abutment plate fixed to said hub and in sliding engagement with the other plate of said outer member, an intermediate driving element in splined connection by a plurality of splines on each of its opposite faces with said hub flange and with the juxtaposed plate of said outer member, a truncated cone slidably mounted on said hub and at all times in bearing engagement with said socket, and resilient means interposed between said cone and the abutment plate fixed to said hub sleeve.

5. A resilient transmission for vehicle wheels, comprising two revoluble members capable of eccentric displacement and mounted one within the other, an intermediate power transmitting element slidably engaging said members and having a plurality of splined connections with each of said members, said element having means to effect a flow of lubricant, and resilient means tending to maintain the axial alignment of said members.

6. A resilient transmission for vehicle wheels, comprising two revoluble members capable of eccentric displacement, an intermediate power transmitting element slidably engaging said members and having a plurality of splined connections with each of them, one of said members having an inboard and an outboard bearing with the other, the outer of said members having a conical socket, a truncated cone cooperating with said socket and loosely mounted on said inner member, resilient means tending to maintain the axial alignment of said members, and a reinforcing element in threaded engagement with one of said revoluble members and bearing against said outboard bearing to oppose the thrust of said resilient means.

7. A resilient transmission for vehicle wheels, comprising two revoluble members capable of eccentric displacement and disposed one within the other, an intermediate driving member in splined engagement with said members, with the splines for one revoluble member disposed at an angle to the splines for the other revoluble member, the sum of the splines for each member having a total length greater than the diameter of said inner member, and resilient means tending to maintain the axial alignment of said members.

8. In a resilient transmission for vehicle wheels, comprising two members capable of relative eccentric displacement, an intermediate driving element in sliding engagement with said members, the sliding engagement on each face of said element being in a linear direction with the direction of movement on one face at an angle with the direction of movement on the opposite face of said element, one of said members having a bowl which is cone-shaped at the peak, curved in cross-section at its base and merges into a cylinder parallel with the axis at its base to vary downward movement of one of said members, the other of said members having a reciprocating sleeve provided with a skirt to cooperate with said bowl, said skirt being cone-shaped and truncated at its peak and forming at its base into a cylinder with a smaller radius than that of the base of the bowl cone, said cylinder being parallel with the axis at said skirt base.

9. A resilient transmission for vehicle wheels, comprising two revoluble members capable of eccentric displacement, one disposed within the other, the inner of said members forming a hub, an intermediate power transmitting element splined to each of said members to provide a total length of splines with each member greater than the greatest diameter of said inner member, an abutment plate detachably carried by said hub, and forming an outboard bearing with said outer member, resilient means tending to maintain the axial alignment of said members, and means for locking said outboard abutment plate to said hub to prevent any relative movement therewith.

10. A resilient bearing for vehicle wheels, comprising an outer rim member having inwardly extending spaced annular plates, a conical bowl fixed to the inner peripheries of said plates and extending from one plate to the other, a hub member, an abutment plate fixed to the hub member and forming an inboard bearing with one of said rim member plates, and an outer abutment plate detachable from said hub member and locked therewith to prevent relative rotation and having an outboard bearing with the other of said rim plates, said abutment plates being movable under eccentric displacement of said members into close proximity to said rim member, a truncated cone cooperating with said bowl and forming with it the sole load bearing support of the wheel, and resilient means between said cone and said outer abutment plate and tending to maintain the axial alignment of said rim and said hub member.

11. A resilient bearing for vehicle wheels comprising two revoluble members disposed one within the other and capable of eccentric displacement, one of said members having an inboard bearing on the other member, an abutment plate carried by one of said members and having an outboard bearing with the other member, said members having a frictional bearing connection between them, resilient means disposed between said bearing connection and said abutment plate, and a reinforcing element in threaded engagement with the inner of said members at its central portion and overhanging and bearing against said abutment plate to oppose the action there-against of said resilient means.

12. A resilient transmission and bearing for vehicle wheels, comprising two revoluble members at all times in bearing engagement with each other and capable of eccentric displacement, an intermediate power transmitting element having its opposite side walls slidably engaging said members and splined thereto throughout the area of said engagement, and resilient means tending to maintain the axial alignment of said members.

13. A resilient transmission and bearing for vehicle wheels, comprising two revoluble members at all times in bearing engagement with each other but capable of eccentric displacement, an intermediate power transmitting element slidably engaging said members and splined thereto throughout the area of such engagement to cause relative movement of said members and element longitudinally of said splines, one of said members having an inboard and an outboard bearing on the other to maintain their alignment during eccentric displacement, and resilient means tending to maintain the axial alignment of said members.

14. A resilient transmission and bearing for vehicle wheels comprising two revoluble members capable of eccentric displacement disposed one within the other, the inner of said members having at each end an abutment plate cooperating with opposite side walls of said outer member, an intermediate power transmitting element splined to each of said members at a plurality of places to permit of their eccentric displacement and resilient means cooperating with said members and tending to maintain their axial alignment.

15. A resilient transmission and bearing for vehicle wheels, comprising two revoluble members in continuous bearing engagement with each other and capable of eccentric displacement, an intermediate power transmitting element splined at a plurality of places to each of said members to permit of their eccentric displacement with the splines on each face in parallelism and with the splines on one face disposed at an angle to the splines on the opposite face, and resilient means tending to maintain the axial alignment of said members.

16. A resilient transmission and bearing for vehicle wheels, comprising two revoluble members in continuous bearing engagement with each other and capable of eccentric displacement, one of said members having abutment plates in bearing engagement with the side walls of the other of said members, sealing means between said plates and such side walls, an intermediate power transmitting element splined at a plurality of places to each of said members, the splines for one member being disposed at an angle with the splines for the other member, and resilient means tending to maintain the axial alignment of said members.

17. A resilient transmission and bearing for vehicle wheels, comprising two revoluble members disposed one within the other and capable of eccentric displacement, the outer of said members having a conical socket, the inner of said members having a sleeve provided with a skirt to cooperate with said conical socket, an intermediate power transmitting element splined to each of said members to provide a total length of splines on each face of said element greater than the diameter of said inner member, and resilient means tending to maintain the axial alignment of said members.

18. A resilient transmission and bearing for vehicle wheels, comprising two revoluble members in continuous bearing engagement with each other and capable of eccentric displacement, an intermediate power transmitting element having means to effect the flow of lubricant and splined at a plurality of places to each of said members, and resilient means tending to maintain the axial alignment of said members.

19. A resilient transmission and bearing for vehicle wheels, comprising two revoluble members in continuous bearing engagement with each other and capable of eccentric displacement, an intermediate power transmitting element splined at a plurality of places to each of said members, the splines for one member being disposed at an angle to the splines of the other member, an abutment plate carried by one member and forming an outboard bearing with the other member, and a reinforcing element in threaded engagement with the inner of said members and bearing against said abutment plate.

20. In a resilient transmission and bearing for vehicle wheels, comprising two members capable of relative eccentric displacement, one of said members having a bowl which is cone-shaped at the peak, curved in cross section at its base and merging into a cylinder at the base parallel with its axis to retard the downward movement of one of said members, the other of said members having a reciprocating sleeve provided with a skirt to cooperate with said bowl, said skirt being cone-shaped and truncated at its peak and forming at its base into a cylinder with a smaller radius than that of the base of the bowl cone, said cylinder being parallel with the axis at said skirt base, and an intermediate driving element having rows of splines on opposite faces in splined engagement with and forming the sole driving connection between said members.

21. A resilient transmission and bearing for vehicle wheels comprising two revoluble members disposed one within the other at all times in bearing engagement with each other but capable of eccentric displacement, a friction connection between said members, resilient means to cooperate with said frictional connection to retain said members in cooperative relationship under eccentric displacement, and a power transmitting element in splined engagement with each of said members with the splines arranged in parallel rows on each side of said element to provide a greater length of drive on each side of said element than the outside diameter of said element.

22. In a resilient transmission for vehicle wheels, two revoluble members disposed one within the other and capable of eccentric displacement, an intermediate power transmitting element in driving engagement with said members and constructed to provide a total length of drive on each side of said element greater than its outer diameter, the engaging surfaces of said members and said power transmitting element being plane surfaces, and resilient means tending to maintain said members in axial alignment.

ELBERT A. CORBIN, Jr.